Dec. 28, 1954    L. W. THOMPSON    2,698,413
MOTOR CONTROL SYSTEM FOR POSITIONING DEVICES
Filed Feb. 17, 1954    3 Sheets-Sheet 1

Inventor
Louis W. Thompson
Wm O Moeser Atty.

Dec. 28, 1954     L. W. THOMPSON     2,698,413
MOTOR CONTROL SYSTEM FOR POSITIONING DEVICES
Filed Feb. 17, 1954     3 Sheets-Sheet 2

Inventor
Louis W. Thompson

Dec. 28, 1954 L. W. THOMPSON 2,698,413
MOTOR CONTROL SYSTEM FOR POSITIONING DEVICES
Filed Feb. 17, 1954 3 Sheets-Sheet 3

Inventor
Louis W. Thompson

United States Patent Office 2,698,413
Patented Dec. 28, 1954

2,698,413

MOTOR CONTROL SYSTEM FOR POSITIONING DEVICES

Louis W. Thompson, Schenectady, N. Y., assignor to Jones & Lamson Machine Company, Springfield, Vt., a corporation of Vermont Application February 17, 1954, Serial No. 410,790

3 Claims. (Cl. 318—265)

My invention relates to a method of and means for stopping rotating elements at some predetermined angular position or at any one of a number of angular positions.

For illustrative purposes only, I will hereinafter describe my invention as applied to a machine tool spindle. It is often necessary at the end of a machining cycle to position the spindle in a given angular position. This may be necessary to align wrench sockets on the rotating chuck with power driven wrenches now in common use. Certain workpieces are driven by drivers which may engage lugs or other convenient configurations on the work. In such a case the spindle must be oriented in proper relation to the workpiece, which is presented to the machine tool on a cradle or other work loading device. It is now common practice to turn automobile pistons in an elliptical form with a minute degree of eccentricity. The axes of such ellipse must, of course, bear an exact angular relationship with other reference points on the piston, such as the wrist pin holes or the like.

For the foregoing, and many other reasons, it is necessary after braking the main spindle drive to bring the spindle itself to rest at a known and repeatable angular position. This has been accomplished by manual positioning to some fiducial line conveniently placed for an operator. It has also been proposed to jog the main drive and main brake alternately until a desired position is reached. At such point, limit switches may indicate that the proper position has been achieved, and terminate the action. The first method described above is tiring, time consuming and completely unsuited to modern high production on automatic machines. The second method involves undue wear on the clutch and brake, and it is difficult to produce the necessary few degrees of rotation with the same multi-horsepower main drive capable of turning a spindle at high speeds.

It is a principal object of my invention to provide a novel sensing device which indicates when a rotatable element is in a desired position, and controls a driving means to direct said element to the desired position by the shortest possible path.

It is a further object of my invention to achieve the principal object by mechanism which is simple, rugged, and inexpensive, and which is readily applicable to almost any rotational element.

These and other objects and advantages of my invention will become apparent from the following specification and accompanying drawings in which.

Figure 2:
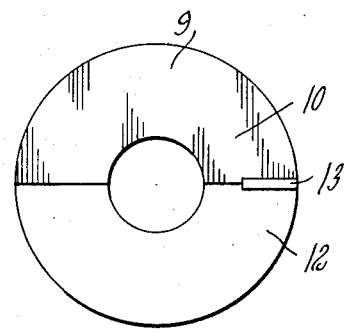
Figures 2, 3 and 4 show three of the varieties of discs which may be used as hereinafter explained.

Referring now more particularly to the drawings, a machine tool headstock 5 is shown, carrying a work holding fixture 6. The work may be supported by a tailstock 7, as is conventional practice. Such a machine may be of the type generally described as a single spindle automatic lathe and shown in U. S. Patent 2,570,660, issued October 9, 1951, to R. M. Gamble. In the automatic loading of such a machine, as described in said patent, it is often necessary to bring the spindle 8 to rest in a pre-established position or in any one of several positions. To accomplish this, I provide a disc 9 which may be made of plastic, aluminum, or any other material of relatively low permeability. The disc 9 is fastened to and rotates with the machine spindle. A plate of soft iron 10, or other material of high permeability, is affixed to the disc 9 and provides an area of high permeability on the face of the disc, as shown in Figure 2. At the juncture of the two areas 10 and 12 an iron slug 13 is set to provide a localized area of extremely high permeability.

Referring again to Figure 1, a sensing coil 14 is mounted in close spaced relationship to the face of disc 9. The coil 14 may be positioned in close proximity to the disc, say, with a gap of .020 inch from area 12, .010 inch from area 10, and .005 inch from the slug 13. It should be understood that the spindle 8 is mounted rigidly for precise rotation, and the coil 14 may be mounted at the rear of the headstock 5 in a fixed and accurate position with respect to the disc 9.

Figure 4:
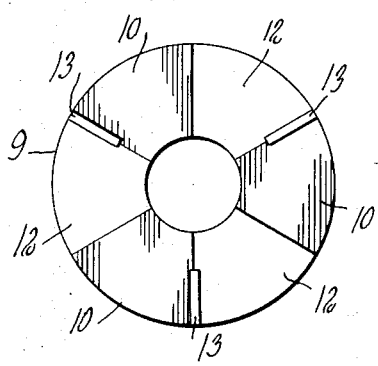
Figure 5:
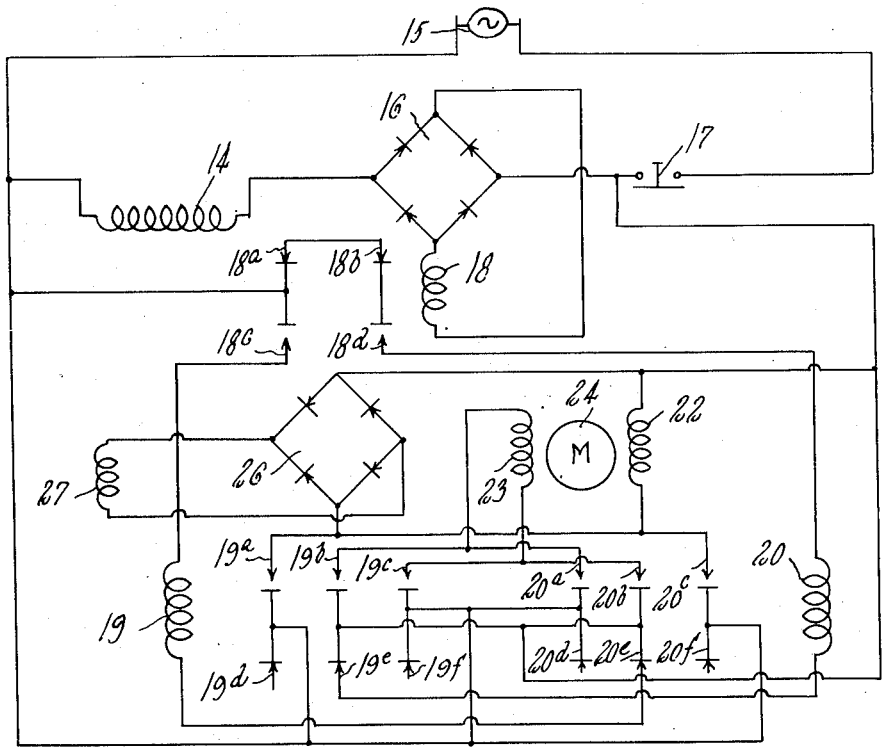
Figure 5 is a schematic diagram showing the arrangement of the electrical components shown generally in Figure 1.

The coil 14 is in a circuit having a suitable source of electric current 15, which may be rectified at 16, Figure 4. A switch 17 is provided to energize the circuit. This switch is preferably tied in with the automatic sequencing controls of the machine tool. For example, a given time after the main brake is applied to the spindle (a sufficient period to bring the spindle substantially to zero speed), the brake can again be released, and the switch 17 closed. This energizes coil 14, and a relay coil 18 which is in series with it. The inductive reactance of the coil 14 will depend on the position of disc 9. This reactance is at a minimum when area 12 is opposite the coil 14, at a middle value when area 10 is opposite the coil 14, and at a maximum when the slug 13 is opposite the coil 14.

Figure 9:
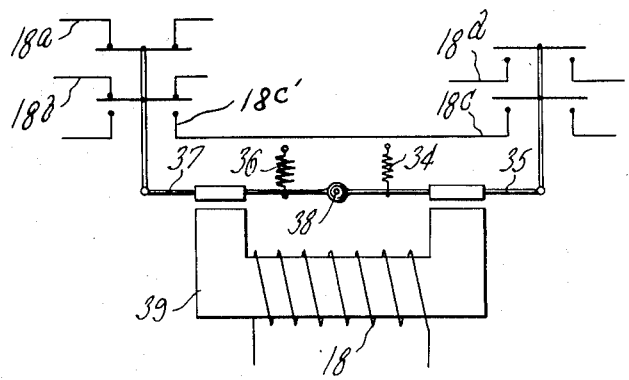
Figure 9 is a detailed view of a two stage relay employed in the electrical circuit of Figure 5.

Relay coil 18 controls contacts 18a, 18b, 18c and 18d. Contacts 18a and 18b are normally closed as shown most clearly in Figure 9. The relay armatures 35 and 37 are pivoted at 38, and each are mechanically biased in the position shown by springs 34 and 36 respectively. Spring 36 is heavier than spring 34. Therefore, a middle value of current through coil 18 will actuate only armature 35, while a high value of current through coil 18 will actuate both armatures. Contact 18c has another contact 18c' in series with it. Thus it will be seen that the following table expresses the position of the contacts for three levels of current in the coil 18:

|     | Normal | Middle Value | Full Current |
| --- | --- | --- | --- |
| 18a | closed | closed | open. |
| 18b | do | do | Do. |
| 18c | open | open | closed. |
| 18d | do | do | Do. |

If the current through coil 18 is at a high value upon closing of the switch 17 (that is, when the inductive reactance of coil 14 is at a minimum) contacts 18c and 18d will close and contacts 18a and 18b will open. This action energizes relay coil 19. Normally open contacts 19a, b, and c are then closed and normally closed contacts, 19d, e, and f are opened. Thus a motor winding 22 is energized, as is a winding 23. Winding 23 is connected across the line through contacts 19b and 19c in such a way as to drive the motor 24 in, say, a clockwise direction. Contact 19f may open the spindle brake circuit so as to permit the motor 24 to rotate the spindle.

Figure 1:
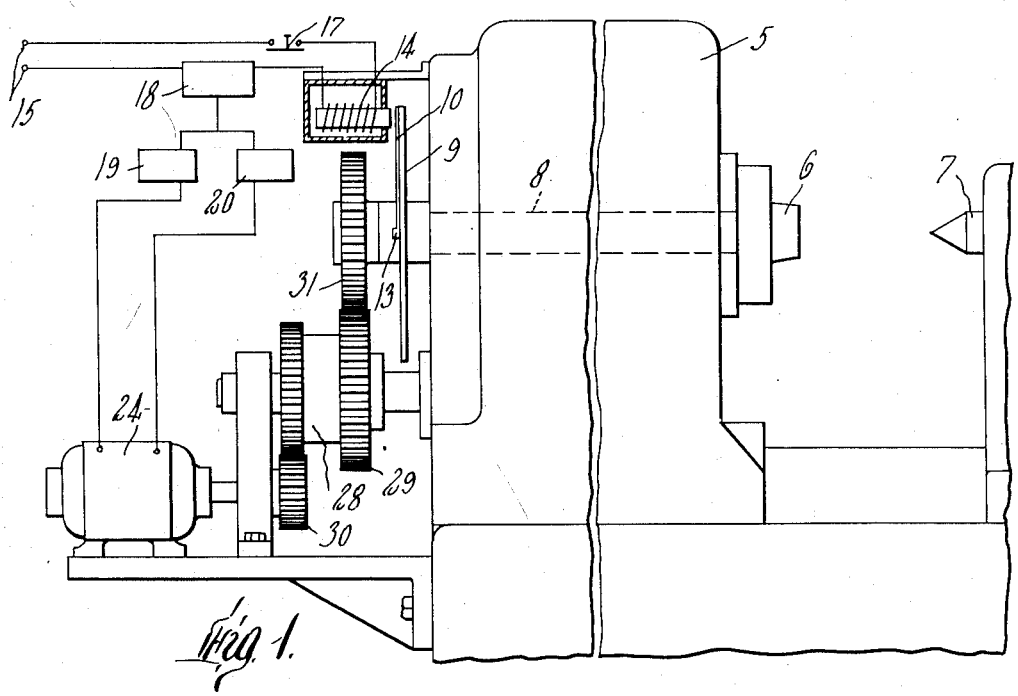
Figure 1 is a general view, partially schematic, showing my invention as applied to a machine tool spindle.
Figure 6:
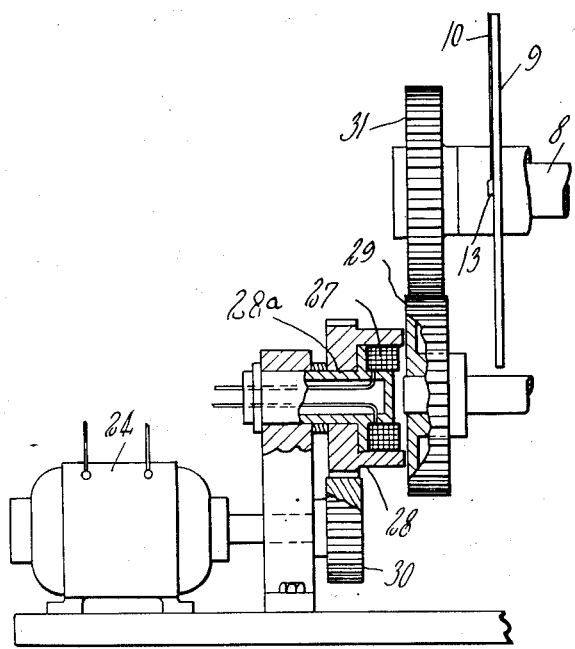
Figure 6 is a sectional view of an electric clutch used in carrying out my invention.
Figure 7:
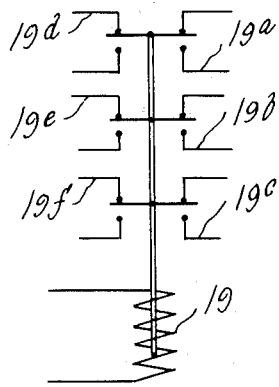
Figures 7 and 8 are views showing the windings employed in the schematic of Figure 5 in operative position with respect to their contacts.
Figure 8:
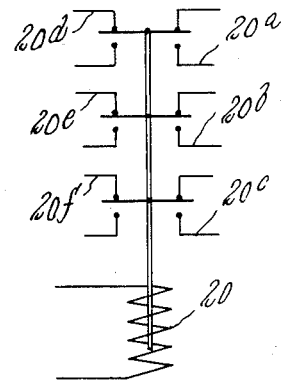

In parallel with the winding 22 I provide direct current through a rectifier 26 to an electric clutch winding shown at 27 in Figures 1 and 6. This clutch is shown in detail in Figure 6. The flux path between gears 28 and 29 is saturated when the winding 27 is energized, thus connecting the gears mechanically. A pinion 30, connected to the motor 24, drives gear 28. Gear 28 is rotatable on a fixed core 28a to which the stationary coil 27 is mounted. Gear 29 is in continuous mesh with a gear 31, which is fastened to and turns with the spindle 8.

With relay coil 19 energized, the motor 24 and clutch winding 27 are energized and the motor rotates the spindle until the slug 13 comes into line with the coil 14. At this time the current in the coil 14 circuit drops to a minimum value. Contactors 18a, b, c, and d return to their normal position, and the motor 24 and clutch winding 27 are de-energized.

The action described above took place after the spindle was initially braked so as to bring the disc 9 with an area 12 opposite the coil 14. If the disc stops with an area 10 opposite the coil 14, the current through relay coil 18 is at a middle value, and the contacts are so set that under such condition the contacts 18a, b, and d are closed and contact 18c remains open since contact 18c' in series with it (Figure 9) remains open. Therefore, relay coil 20 is energized which closes contacts 20a, b, c, and opens contacts 20d, e, f. Contact f may be used to open the spindle brake circuit. Again, motor winding 22 and clutch winding 27 are energized as before. However, winding 23 is now connected across the line through contacts 20b and 20a with its polarity reversed. Motor 24 now runs, say counterclockwise and rotates the spindle until a slug 13 is positioned opposite the coil 14. At that point, again, the current immediately drops to a minimum value, contacts 18a, b, c, d are restored to their normal positions, and the motor and clutch are de-energized. At that time, whether clockwise or counterclockwise rotation has brought the spindle to the desired position, the contact 19f or 20f may be used to restore current to the main brake control. Thus the spindle is securely held during the loading operation. The main brake circuit can be opened again at its main control point when the machine cycle is to be repeated.

Figure 3:
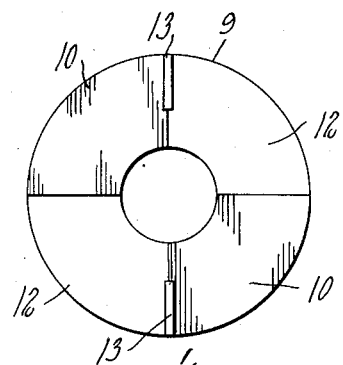

With the disc shown in Figure 2, the spindle will always take the shortest path to the one point designated by the slug 13. If 2 or more positions are permissible or desirable, discs shown in Figures 3 and 4 may be used. In each case, whatever the chance position of stoppage of the spindle, it will be rotated on the shortest path to the nearest slug. Thus the disc 9 not only provides directional sense to the positioning mechanism, but also provides the end point indication.

It is apparent that with the mechanism hereinbefore described the positioning of rotational elements may be achieved automatically, with no intervention on the part of an operator. Further, the means are rugged, simple elements which are inexpensive to manufacture and require only occasional attention. While I have described preferred embodiments of my invention for illustrative purposes, modifications within the spirit and scope of the following claims may occur to persons skilled in the art.

I claim:
1. A device for controlling a rotating element comprising, a disc rotating with said element, areas on said disc of relatively high and low permeability, a narrow band of highly permeable material at a juncture of said areas, an electric circuit including an impedance in reactive relationship to said disc, power means for rotating said element in either direction, means responsive to current values in said circuit to control the direction of rotation of said power means, and means to de-energize said power means when said band is at a minimal distance from said impedance.

2. A device for positioning a rotating element in any one of a number of given angular positions comprising, a disc rotating with said element, areas on said disc of alternately high and low permeability, the junction lines defining said areas being radial, narrow segments of highly permeable material at selected junctions of said areas, an electric circuit including an impedance in reactive relationship to said disc, power means for rotating said element in either direction and means responsive to current values in said circuit to control the direction of rotation of said power means.

3. A device for positioning a rotating element in any one of a number of given angular positions comprising, a disc rotating with said element, areas on said disc of alternately high and low permeability, the junction lines defining said areas being radial, narrow segments of highly permeable material at selected junctions of said areas, an electric circuit including an impedance in reactive relationship to said disc, power means for rotating said element in either direction, means responsive to current values in said circuit to control the direction of rotation of said power means, and means to de-energize said power means when a segment is at a minimal distance from said impedance.

References Cited in the file of this patent
UNITED STATES PATENTS

| Number | Name | Date |
|--------|------|------|
| 2,618,770 | Schwarz | Nov. 18, 1952 |